US008826161B2

(12) United States Patent
Yamada

(10) Patent No.: US 8,826,161 B2
(45) Date of Patent: Sep. 2, 2014

(54) IMAGE FORMING CONTROL METHOD AND IMAGE PROCESSING APPARATUS

(75) Inventor: Takafumi Yamada, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 176 days.

(21) Appl. No.: 13/072,059

(22) Filed: Mar. 25, 2011

(65) Prior Publication Data
US 2012/0054597 A1 Mar. 1, 2012

(30) Foreign Application Priority Data

Aug. 31, 2010 (JP) ................................ 2010-194707

(51) Int. Cl.
G06F 17/00 (2006.01)
G06F 17/22 (2006.01)
G06F 17/30 (2006.01)

(52) U.S. Cl.
CPC ...... *G06F 17/2247* (2013.01); *G06F 17/30011* (2013.01); *G06F 17/30905* (2013.01); *G06F 17/30899* (2013.01)
USPC .... 715/764; 715/760; 715/234; 707/E17.121; 707/E17.119

(58) Field of Classification Search
CPC .............. H04L 67/02; G06F 17/30011; G06F 17/30905; G06F 17/30899; G06F 17/30893; G06F 3/1204; H04N 21/4622; G06Q 10/10
USPC ......... 715/201, 203, 205, 234–235, 241, 256, 715/274, 723, 760, 764, 770; 358/1.15; 707/E17.119, E17.121
See application file for complete search history.

(56) References Cited

U.S. PATENT DOCUMENTS 5,659,791 A * 8/1997 Nakajima et al. ............. 715/202
5,905,866 A * 5/1999 Nakabayashi et al. ........ 709/223
(Continued)

FOREIGN PATENT DOCUMENTS

JP 2001265541 A 9/2001
JP 2002-351636 12/2002
(Continued)

OTHER PUBLICATIONS

DeWitt et al.,"Advanced Web Clipping Using WebSphere Portal Version 4.1," © 2002, IBM DeveloperWorks, downloaded from <"http://www.ibm.com/developerworks/websphere/library/techarticles/0210_dewitt/dewitt.html">, 13 pages.*

(Continued)

*Primary Examiner* — Cesar Paula
*Assistant Examiner* — James H Blackwell
(74) *Attorney, Agent, or Firm* — Scully, Scott, Murphy & Presser PC

(57) ABSTRACT

Various embodiments for forming an image of selected objects from a web page are provided. An example of an image processing apparatus comprises a web page display unit which, based on web page data supplied from a web page data source, is configured to display web pages on a web page display range present on the screen of a display apparatus, an object information storage control unit configured to control the storing of object information including information necessary to print selected objects from the web pages based upon a user selection in a storage unit, an object information update control unit configured to control updating of object information describing the stored object with object information describing the latest object corresponding to the stored object, and an image forming control unit configured to control the formation of images of objects on an output medium based on the stored object information.

10 Claims, 11 Drawing Sheets

(56) References Cited

U.S. PATENT DOCUMENTS

| | | | |
|---|---|---|---|
| 6,366,923 B1* | 4/2002 | Lenk et al. | 707/706 |
| 6,976,210 B1* | 12/2005 | Silva et al. | 715/205 |
| 7,103,838 B1* | 9/2006 | Krishnamurthy et al. | 715/202 |
| 7,519,573 B2* | 4/2009 | Helfman et al. | 1/1 |
| 7,647,351 B2* | 1/2010 | Monsarrat | 715/235 |
| 7,917,846 B2* | 3/2011 | Decker et al. | 715/234 |
| 7,934,152 B2* | 4/2011 | Krishnamurthy et al. | 715/234 |
| 8,175,410 B2* | 5/2012 | Park et al. | 382/274 |
| 8,176,410 B1* | 5/2012 | Hausig | 715/201 |
| 2002/0113994 A1* | 8/2002 | Smith et al. | 358/1.15 |
| 2002/0135806 A1* | 9/2002 | Yoshino | 358/1.15 |
| 2005/0138033 A1* | 6/2005 | Katta et al. | 707/10 |
| 2005/0183004 A1* | 8/2005 | Lerner et al. | 715/512 |
| 2005/0246651 A1* | 11/2005 | Krzanowski | 715/770 |
| 2005/0267869 A1* | 12/2005 | Horvitz et al. | 707/2 |
| 2006/0041589 A1* | 2/2006 | Helfman et al. | 707/104.1 |
| 2006/0069808 A1* | 3/2006 | Mitchell et al. | 709/246 |
| 2006/0242145 A1* | 10/2006 | Krishnamurthy et al. | 707/6 |
| 2006/0277481 A1* | 12/2006 | Forstall et al. | 715/764 |
| 2007/0106952 A1* | 5/2007 | Matas et al. | 715/764 |
| 2008/0184138 A1* | 7/2008 | Krzanowski et al. | 715/760 |
| 2008/0201452 A1* | 8/2008 | Athas et al. | 709/219 |
| 2008/0294981 A1* | 11/2008 | Balzano et al. | 715/256 |
| 2008/0307301 A1* | 12/2008 | Decker et al. | 715/241 |
| 2008/0307308 A1* | 12/2008 | Sullivan et al. | 715/723 |
| 2009/0055727 A1* | 2/2009 | Hansen et al. | 715/234 |
| 2009/0265626 A1 | 10/2009 | Suga | |

FOREIGN PATENT DOCUMENTS

| | | |
|---|---|---|
| JP | 2004086722 A | 3/2004 |
| JP | 2004336463 A | 11/2004 |
| JP | 2005128966 A | 5/2005 |
| JP | 2007226597 A | 9/2007 |
| JP | 2009053866 A | 3/2009 |
| JP | 2009-258966 | 11/2009 |
| JP | 2010158815 A | 7/2010 |

OTHER PUBLICATIONS

DeWitt, "Basic Web Clipping Using WebSphere Portal Version 4.1," © 2002, IBM DeveloperWorks, downloaded from <"http://www.ibm.com/developerworks/websphere/library/techarticles/0206_dewitt/dewitt.html">, 11 pages.*

Basu, S.,"Ditching Evernote? Check Out 5 Free Web Clipping Alternatives," © 2010, downloaded from <"http://www.makeuseof.com/tag/ditching-evernote-check-5-free-web-clipping-alternatives/">, 11 pages.*

Decision to Grant dated Jul. 17, 2012 received in counterpart Japanese application.

* cited by examiner

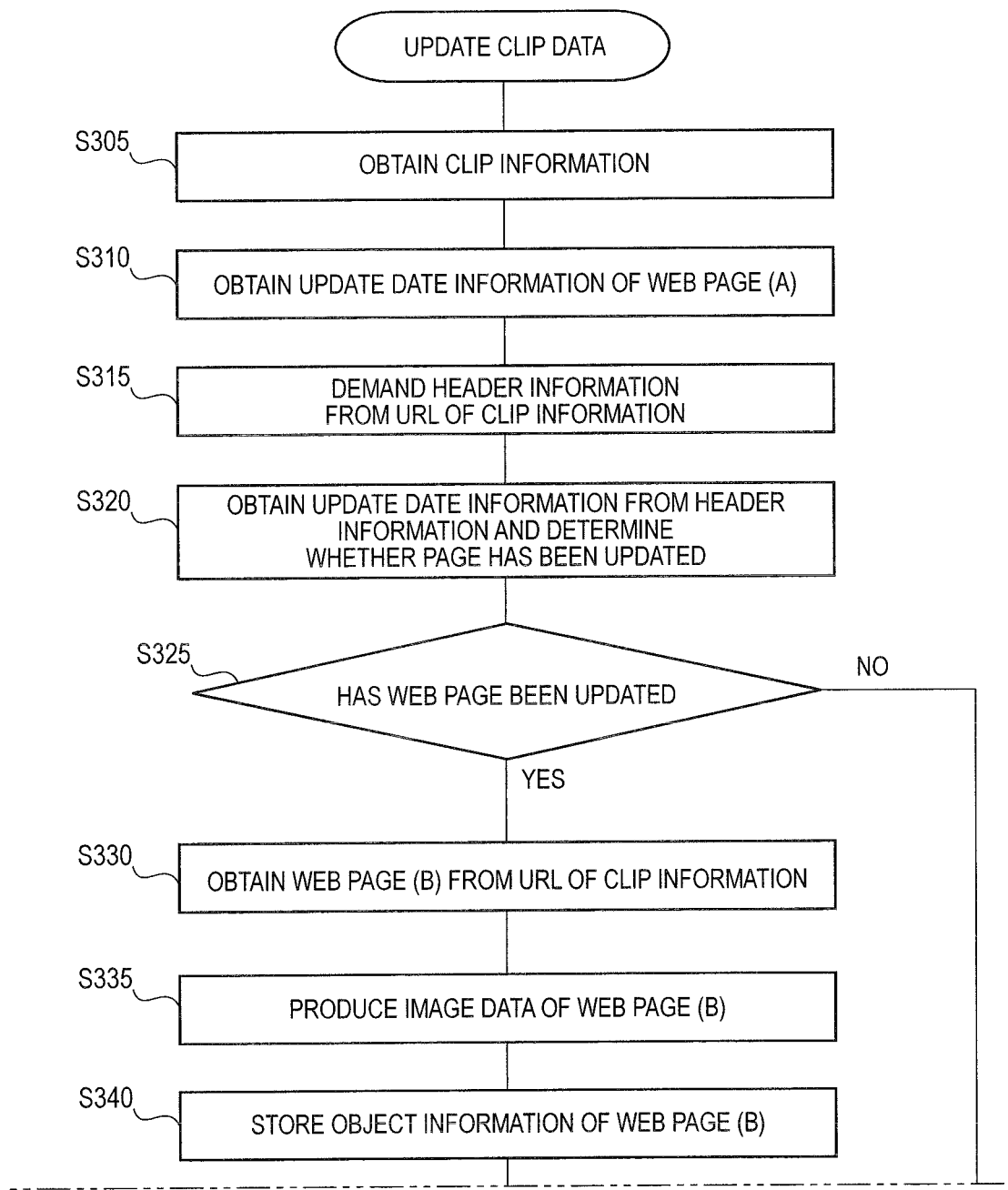

FIG. 6A
FIG. 6B
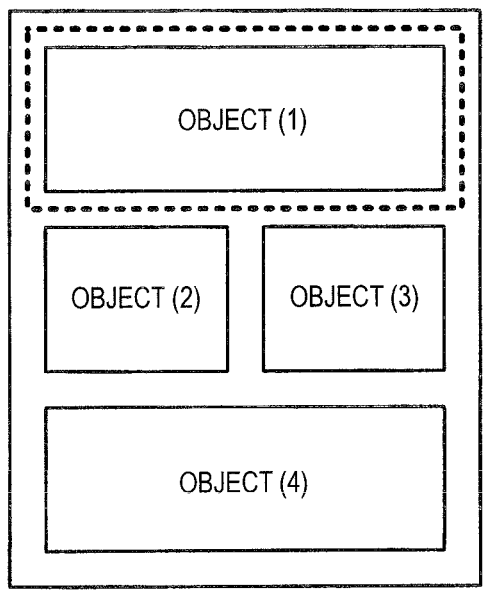
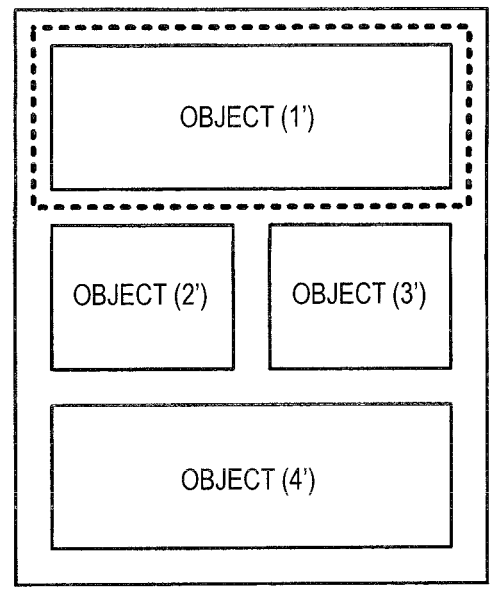

FIG. 6C

| LOCATION INFORMATION | OBJECT (1') | OBJECT (2') | |
|---|---|---|---|
| RANGE | 10,10 | 10,100 | ⋮ |
| PROPERTY | 250,75 | 40,75 | ⋮ |
| | TEXT | IMAGE | ⋮ |
| SUBSTANCE DATA | EXHIBIT NEW PRODUCTS OF PRINTER AND MULTI-FUNCTION PERIPHERAL MACHINE! [LINEBREAK] HOLD "WORLD JAPAN 2010" | Aaa.gif | ⋮ |
| SUBSTANCE SIZE | | 39,240 BYTES | |
| DISPLAY SIZE | 1024 X 800 | 1024 X 800 | ⋮ |
| LETTER SIZE | MAXIMUM | MAXIMUM | ⋮ |
| DISPLAY MAGNIFICATION | 100% | 100% | ⋮ |

FIG. 6D

| LOCATION INFORMATION | 8,5 |
|---|---|
| RANGE | 290,100 |
| OBJECT | OBJECT (1') |
| URL | http://www.xxxx.xxxx |

FIG. 7A
```
HTTP/1.1 200 OK
Cache-Control: public
Date: Mon, 12 Jul 2010 11:29:29 GMT
ETag: 634144896440000000
Server: Microsoft-IIS/7.5
Content-Length: 91968
Content-Type: text/html; charset=utf-8
Expires: Mon, 12 Jul 2010 11:39:30 GMT
Last-Modified: Mon, 12 Jul 2010 07:00:44 GMT    ← UPDATE DATE INFORMATION
Client-Date: Mon, 12 Jul 2010 11:29:27 GMT
Client-Peer: 64.4.31.252:80
Client-Response-Num: 1
```
FIG. 7B
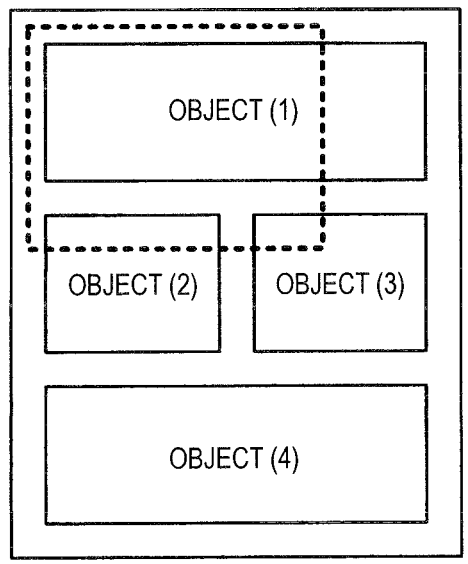
FIG. 7C
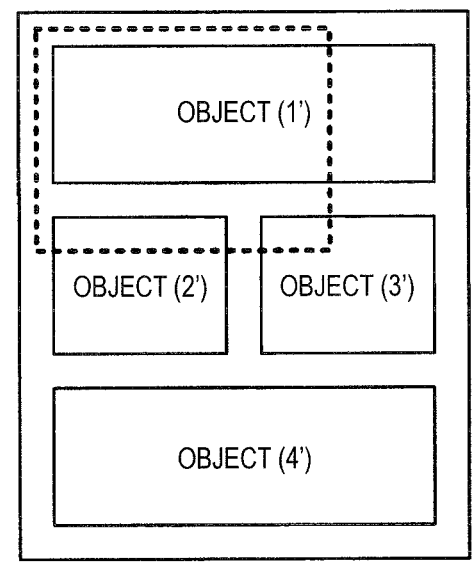

FIG. 9A

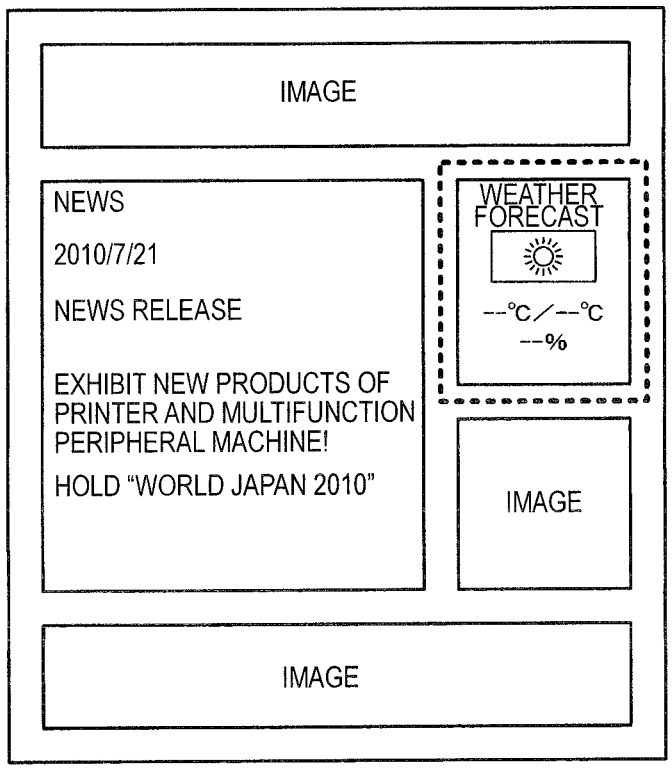

FIG. 9B

```
<div class="weatherclass" id="weather">
<h3> WEATHER FORECAST </h3>
<ul>
<li id="icon"><img width="33" height="20" src="http://xxxx.jp/images/icon.gif"></li>
<li id="temperature"><span class="high">--°C</span>
<span class="text">/</span>
<span class="low">--°C</span></li>
<li id="probability">--%</li>
</ul>
</div>
```

FIG. 9C

```
<div class="left"> NEWS </div>
<div class="left">2010/7/21</div>
<a href="./news/2010/pvfair2010/index.htm"> NEWS RELEASE </a>
<p> EXHIBIT NEW PRODUCTS OF PRINTER AND MULTI-FUNCTION PERIPHERAL
MACHINE! <br> HOLD "WORLD JAPAN 2010" </p>
```

IMAGE FORMING CONTROL METHOD AND IMAGE PROCESSING APPARATUS

CROSS-REFERENCE TO RELATED APPLICATIONS

This application claims priority from Japanese Patent Application No. 2010-194707 filed on Aug. 31, 2010, the entire subject matter of which is incorporated herein by reference.

TECHNICAL FIELD

The present invention relates to an image forming control method and an image processing apparatus.

BACKGROUND

There has been proposed a technology in which, once a user performs an operation of specifying a desired range on a web page, clips only the specified range as a clip data and then prints out a clip image for the clip data.

In addition, among technologies capable of clipping as above, there have also been proposed technologies provided with a function of saving the clip images. By using such a saving function, it is possible to save a clip image when clipping the clip image and then to perform the browsing or printing of the clip image, which has been saved in the past, at a point in time in the future where the browsing or printing of the clip image is required.

SUMMARY

Illustrative aspects of the invention provide an image forming control method and an image processing apparatus capable of saving clip images which have been clipped from web pages and, furthermore, of simply updating objects included in saved clip images to latest objects.

BRIEF DESCRIPTION OF THE DRAWINGS

FIGS. 4A and 4B are flowcharts of a process that updates clip data;

FIG. 6A is an explanatory diagram showing an example of a web page and a clip range, FIG. 6B is an explanatory diagram showing an example of a web page and a clip range imaged on a memory, FIG. 6C is an explanatory diagram showing an example of object information and FIG. 6D is an explanatory diagram showing an example of clip information;

FIG. 7A is an explanatory diagram showing an example of header information obtained from a web server, FIG. 7B is an explanatory diagram showing an example of the to-be-updated web page (A) and FIG. 7C is an explanatory diagram showing an example of the updated web page (B);

FIG. 9A is an explanatory diagram showing an example of a web page including news and a weather forecast as objects, FIG. 9B is an explanatory diagram showing markup document data of a part corresponding to the weather forecast which is an example of the objects and FIG. 9C is an explanatory diagram showing markup document data of a part corresponding to the news which is an example of the objects.

DETAILED DESCRIPTION

General Overview

Figure 1:
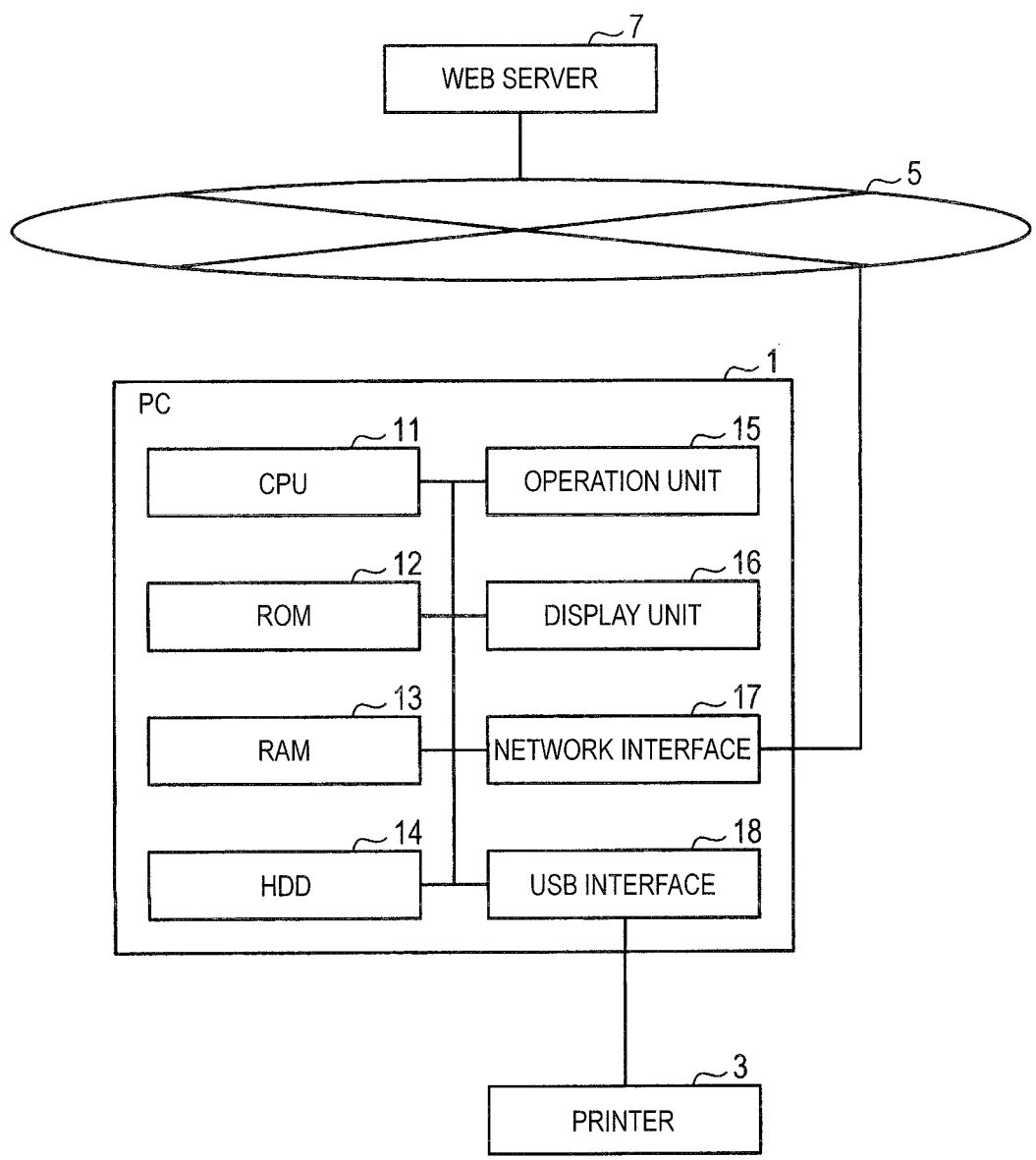
FIG. 1 is a block diagram of an entire system provided with a PC and a printer.

Among the related-art clip images as described above, there are clip images which include objects (text data or image data) that are frequently updated on a web page.

However, even when such objects are updated on a web page, clip images which have been saved using the above saving function include only to-be-updated objects.

As a result, even when performing the browsing or printing of such saved clip images, it is not possible to browse or print updated objects. In addition, in a case in which it is desired to perform the browsing or printing of clip images including updated objects, a user must run an operation again that specifies a desired range on the updated web page, which causes a problem in that cumbersome operations are imposed as the frequency of updates increases.

In order to solve the above-described problems, illustrative aspects of the invention provide an image forming control method and an image processing apparatus capable of saving clip images which have been clipped from web pages and, furthermore, of simply updating objects included in saved clip images to latest objects.

According to a first aspect of the invention, there is provided a computer-readable medium having an image forming control program stored thereon and readable by a computer on which a web page display unit is operated, wherein the web page display unit is configured to display web pages that the web page data describe on a web page display range present on the screen of a display apparatus based on web page data supplied from a web page data source, said image forming control program, when executed by the computer, causes the computer to perform functions comprising: an object information storage control unit which, in a case in which a user performs an operation to select one or a plurality of objects from objects configuring the web pages displayed on the web page display range, performs control that stores in a storage unit object information including information necessary to print the selected objects; an object information update control unit which, in a case in which a user performs an operation that gives a command for updating the stored object that is described by the object information stored in the storage unit by the object information storage control unit, performs control that updates, among objects configuring the latest web page supplied from the source, object information describing the stored object stored in the storage unit with object information describing the latest object corresponding to the stored object; and an image forming control unit that controls to form images of objects that the object information describes on an output medium based on the object information stored in the storage unit.

If the computer is made to serve as each of the above units with an image forming control program configured as above, it is possible to select and store, among objects configuring web pages, desired objects in the storage unit and then form the images of the stored objects on output media with an image forming apparatus. Furthermore, if a user performs an operation that gives a command for updating the stored objects, it is possible to update the stored objects stored in the storage unit to the latest objects.

Therefore, even without carrying out a user's operation to visually check, using the web page display unit, whether or not objects included in a range clipped as a clip image have been updated, an operation that deletes an old clip image and newly saves a clip image including the latest objects, or the like, respectively, it is possible to form the images of the latest objects on output media with an image forming apparatus in an extremely simple manner.

According to a second aspect of the invention, in the computer-readable medium having an image forming control program, wherein the functions further comprises: a determination unit which, in a case in which a user performs an operation that gives a command for update of the stored object that is described by the object information stored in the storage unit by the object information storage control unit, determines whether or not the stored object and the latest object are identical, wherein in a case in which the determination unit determines the stored object and the latest object are not identical, the object information update control unit performs control that updates object information describing the stored object with object information describing the latest object.

If the computer is made to serve as each of the above units with an image forming control program configured as above, in a case in which a user performs an operation that gives a command for the update of the stored objects, the stored objects stored in the storage unit are updated to the latest object as long as the corresponding objects have been updated to the latest objects in the source of web page data.

Therefore, since there is no case in which the stored objects are updated to the latest objects when there is no objects updated to the latest objects in the source of web page data, needless processes are not performed, and therefore it is possible to reduce a load applied to a computer to a corresponding extent.

According to a third aspect of the invention, in the computer-readable medium having an image forming control program, wherein in a case in which a user performs an operation that gives a command in order to form images of the stored object that the object information stored in the storage unit by the object information storage control unit describes on the image forming apparatus, the determination unit recognizes the user's operation as a user's operation that gives a command for update of the stored object and determines whether or not the stored object and the latest object are identical.

If the computer is made to serve as each of the above units with an image forming control program configured as above, in a case in which a user performs an operation that gives a command in order to form the images of the stored object on an image forming apparatus (for example, if the image forming apparatus is a printing apparatus, a user's operation that gives a command for printing), the fact that the user's operation has been performed updates the stored objects stored in the storage unit to the latest objects.

Therefore, even when no separate operation has been carried out to update the stored objects in advance when forming the images of the stored objects with an image forming apparatus, it is possible to form the images of the latest objects on a printing medium with an image forming apparatus as long as an operation is performed only to form the images of the stored objects in an image forming apparatus.

According to a fourth aspect of the invention, in the computer-readable medium having an image forming control program, wherein the object information storage control unit performs control that stores information including the location of the object in the web page and the type of the object in the storage unit as the object information, and wherein the determination unit recognizes, among objects configuring the latest web page supplied from the source, objects with a location of the object in the web page within a predetermined range from the location of the stored object and the type of the object matching that of the stored object as the latest object corresponding to the stored object, and then determines whether or not the stored object and the latest object are identical.

If the computer is made to serve as each of the above units with an image forming control program configured as above, an object is recognized as the latest object corresponding to the stored object when the object is located within a predetermined range from the location of the stored object and the types of the object and the stored object are matching and then whether or not the object has been updated is determined. Therefore, it is possible to suppress wrong recognition in which an object not related to a stored object is recognized as the latest object in a case in which the configuration of a web page is significantly changed.

According to a fifth aspect of the invention, in the computer-readable medium having an image forming control program, wherein the object information storage control unit performs control that stores information including the update date of the web page in the storage unit as the object information, and wherein in a case in which the update date of the latest web page supplied from the source matches the update date stored as the object information, the determination unit determines that the stored object and the latest object are identical.

If the computer is made to serve as each of the above units with an image forming control program configured as above, in a case in which there is no change in the update date of a web page, it is possible to determine whether or not the stored object and the latest object are identical at a point in time when obtaining merely the header information of the web page. Therefore, it is not necessary to extract candidates of the latest objects from the web page, and therefore it is possible to reduce a load applied to a computer.

According to a sixth aspect of the invention, in the computer-readable medium having an image forming control program, wherein in a case in which a user performs an operation that selects a predetermined range on a web page displayed on the web page display range, the object information storage control unit recognizes the user's operation as a user's operation to select objects present in locations which overlap with the predetermined range and performs control that stores in a storage unit object information including information necessary to print the selected objects.

If the computer is made to serve as each of the above units with an image forming control program configured as above, if a user performs an operation that selects a predetermined range on a web page, it is possible to select objects which are to be stored in a storage unit.

Therefore, even when a user does not know precise ranges occupied by individual objects, it is possible to select desired objects with intuitive operations as if clipping a part of a web page.

According to a seventh aspect of the invention, there is provided an image forming control method for making a computer, on which a web page display unit is operated, wherein the web page display unit is configured to display web pages that the web page data describe on a web page display range present on the screen of a display apparatus based on web page data supplied from a web page data source, the image forming control method controls the computer to: in a case in which a user performs an operation to select one or a plurality of objects from objects configuring the web pages displayed on the web page display range, perform control that stores in a storage unit object information including information necessary to print the selected objects; in a case in which a user performs an operation that gives a command for updating the stored object which is described by the object information stored in the storage unit, perform control that updates, among objects configuring the latest web page supplied from the source, object information describing the stored object stored in the storage unit with object information describing the latest object corresponding to the stored object; and control an image forming apparatus to form images of objects that the object information describes on an output medium based on the object information stored in the storage unit.

According to an eighth aspect of the invention, there is provided an image processing apparatus comprising: a web page display unit which, based on web page data supplied from a web page data source, is configured to display web pages that the web page data describe on a web page display range present on the screen of a display apparatus; an object information storage control unit which, in a case in which a user performs an operation to select one or a plurality of objects from objects configuring the web pages displayed on the web page display range, performs control that stores in a storage unit object information including information necessary to print the selected objects; an object information update control unit which, in a case in which a user performs an operation to update the stored object that is described by the object information stored in the storage unit by the object information storage control unit, performs control that updates, among objects configuring the latest web page supplied from the source, object information describing the stored object stored in the storage unit with object information describing the latest object corresponding to the stored object; and an image forming control unit that controls an image forming apparatus to form images of objects that the object information describes on an output medium based on the object information stored in the storage unit.

According to the image forming control method and the image processing apparatus configured as above, it is possible to select and store, among objects configuring web pages, desired objects in the storage unit and then form the images of the stored objects on output media with an image forming apparatus. Furthermore, if a user performs an operation to update the stored objects, it is possible to update the stored objects stored in the storage unit to the latest objects.

Therefore, even without carrying out a user's operation to visually check, using the web page display unit, whether or not stored objects have been updated, an operation that deletes an old stored object and newly saves an object, or the like, respectively, it is possible to form the images of the latest objects on output media with an image forming apparatus in an extremely simple manner.

Exemplary Embodiments

Hereinafter, exemplary embodiments of the invention will be described.

[System Configuration]

A system to be described hereinafter, as shown in FIG. 1, includes a personal computer 1 (hereinafter, referred to as "PC 1") and a printer 3 which is connected to the PC 1. In addition, the PC 1 is configured to be capable of communicating with a web server 7 through a wide area network (WAN; for example, the internet).

The PC 1, as shown in FIG. 1, includes a CPU 11, a ROM 12, a RAM 13, a hard disk drive 14 (HDD 14), an operation unit 15, a display unit 16, a network interface 17, an USB interface 18 or the like, all of which are well known.

The HDD 14 stores a variety of programs, such as an operating system (OS), a web browser which is to be described below, plug-ins or the like installed in the web browser. Meanwhile, when the CPU 11 runs processes according to the above programs, the RAM 13 reads each of the programs.

The operation unit 15 is configured with a keyboard, a variety of pointing devices (for example, a mouse) or the like. The display unit 16 is configured with a liquid crystal display or the like.

In the PC 1 configured as above, it is possible to activate the web browser with an operation by a user on the operation unit 15. Additionally, after activating the web browser, it is possible to specify the uniform resource locator (URL) of web page data (for example, markup document data written in hyper text markup language (HTML), extensible HTML (XHTML) and extensible markup language (XML)) present on the web server 7 and to issue a request for data acquisition to the web server 7 with operations by the user on the operation unit 15.

In a case in which the web server 7 receives the request, the web server 7 returns web page data as a reply, and then the web page data are acquired in the PC 1 and a web page is displayed on the display unit 16.

In addition, after the web page was displayed on the display unit 16, if the user gives a command for the printing of the web page with an operation on the operation unit 15, the PC 1 can control the printer 3 so as to print the web page on the printer 3.

Furthermore, although the details will be described below, a function is incorporated in the PC 1 that clips a part of the web page displayed on the web browser as a clip image and performs the printing or saving of the clip image (hereinafter, referred to as "the clip function").

By using the clip function, the user can specify a desired range from the web page displayed on the web browser, and therefore it is possible to clip the range as a clip image and to print the clip image. In addition, it is also possible to save the clip image and then perform the printing of the clip image in the future.

[Processes Run in the PC 1]

Next, processes run in the PC 1 will be described based on the flowcharts in FIGS. 2 to 4.

The web browser included in the PC 1 has a mechanism capable of adding a variety of extended functions other than standard functions by installing programs called "plug-ins" in the PC 1. With regard to processes to be described below, the CPU 11 carries out processes as a web browser and processes as a plug-in installed in the web browser, and the processes are realized by performing both processes in a cooperative manner.

Figure 2:
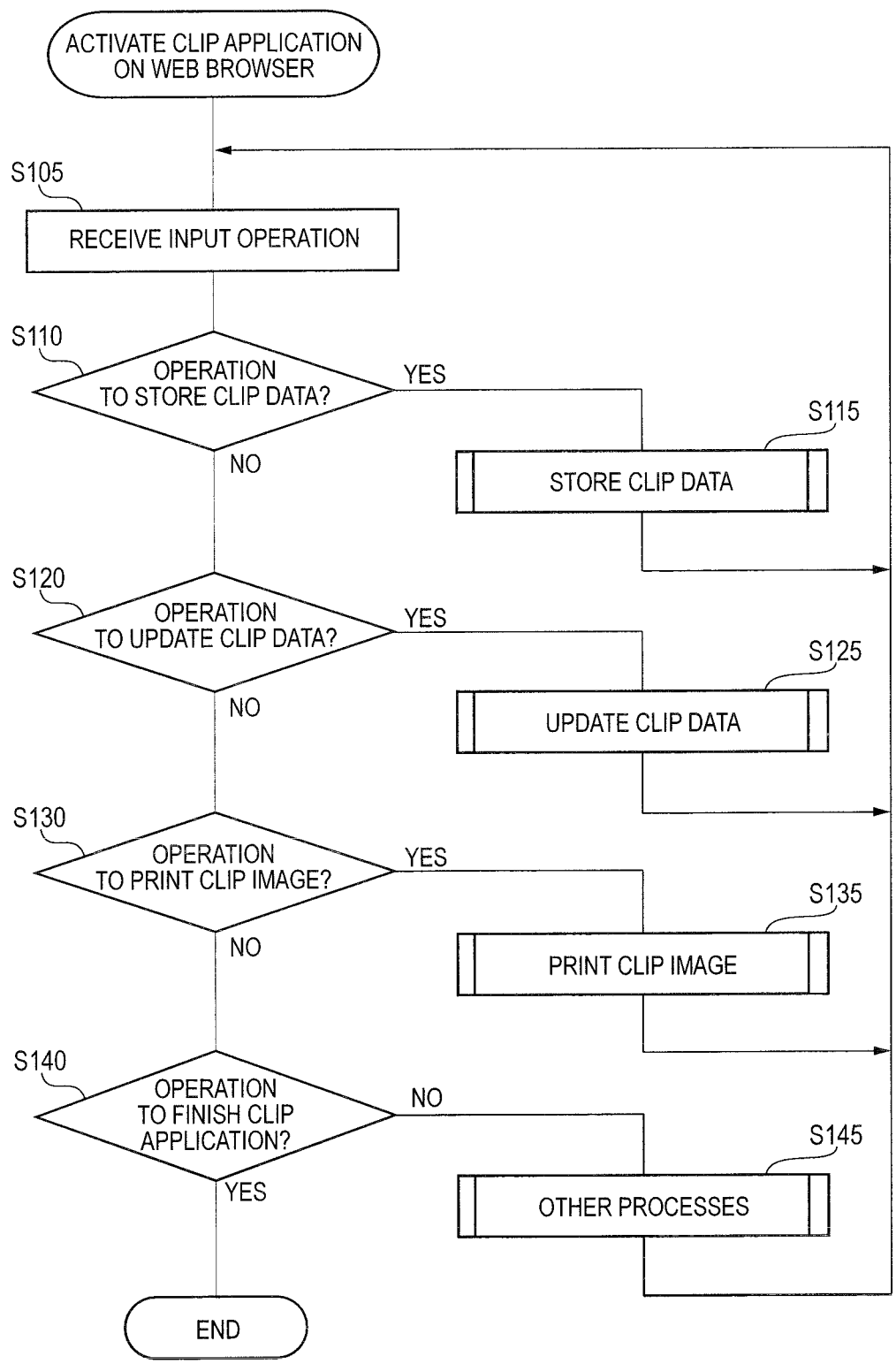
FIG. 2 is a flowchart showing the processes after a clip application is activated on a web browser.

If the process shown in FIG. 2 is started, firstly, the PCI goes into a state for receiving an input operation (S105), and, if receiving any kind of input operation, proceeds to S110.

Subsequently, the PC 1 determines whether or not the received input operation is an operation for storing clip data (S110). The operation for storing clip data may include any kind of operations, but preferable examples thereof include an operation of clicking a "store" button which is displayed in the menu bar on the web browser by the function of a plug-in with a pointing device. Alternatively, the examples may also include a keyboard operation which is assigned an equivalent function of the operation, and, in general, may include a case in which any of the above plural operations is performed.

In S110, if the received input operation is determined as an operation for storing clip data (S110: YES), the PC 1 stores clip data (S115). The details of S115 will be described below. On the other hand, in S110, if the received input operation is not determined as an operation for storing clip data (S110: NO), the PC 1 determines whether or not the received input operation is an operation for updating clip data (S120).

The operation for updating clip data also may be, similarly to the operation for storing clip data, an operation of clicking a button on the screen with a pointing device, a predetermined keyboard operation or the like. Here, if the received input operation is determined as an operation for updating clip data (S120: YES), the PC 1 updates clip data (S125). The details of S125 will be described below.

In addition, in S120, if the received input operation is not determined as an operation for updating clip data (S120: NO), the PC 1 determines whether or not the received input operation is an operation for printing clip data (S130). The operation for printing clip data is also performed by an operation of clicking a button on the screen with a pointing device, a predetermined keyboard operation or the like. Here, if the received input operation is determined as an operation for printing clip data (S130: YES), the PC 1 prints clip data (S135).

Here, in S135, a printing process is performed based on text data or image data, and such a kind of printing process is a well known process run in a variety of software including printing functions, and therefore no more details thereof will be described.

Furthermore, in S130, if the received input operation is not determined as an operation for printing clip data (S130: NO), the PC 1 determines whether or not the received input operation is an operation for finishing clip application (S140). The operation for finishing clip application is also performed by an operation of clicking a button on the screen with a pointing device, a predetermined keyboard operation or the like.

In S140, if the received input operation is not determined as an operation for finishing clip application (S140: NO), the PC 1 runs the other processes (S145). Here, the detailed contents of the processes run in S145 can be considered to include various things, but the details of such processes have no direct relationship with the invention, and therefore no more description will be provided. In addition, in S140, if the received input operation is determined as an operation for finishing clip application (S140: YES), the process shown in FIG. 2 is finished.

[Details of a Process for Storing Clip Data]

Next, the details of S115 will be described based on the flowchart in FIG. 3.

Figure 3:
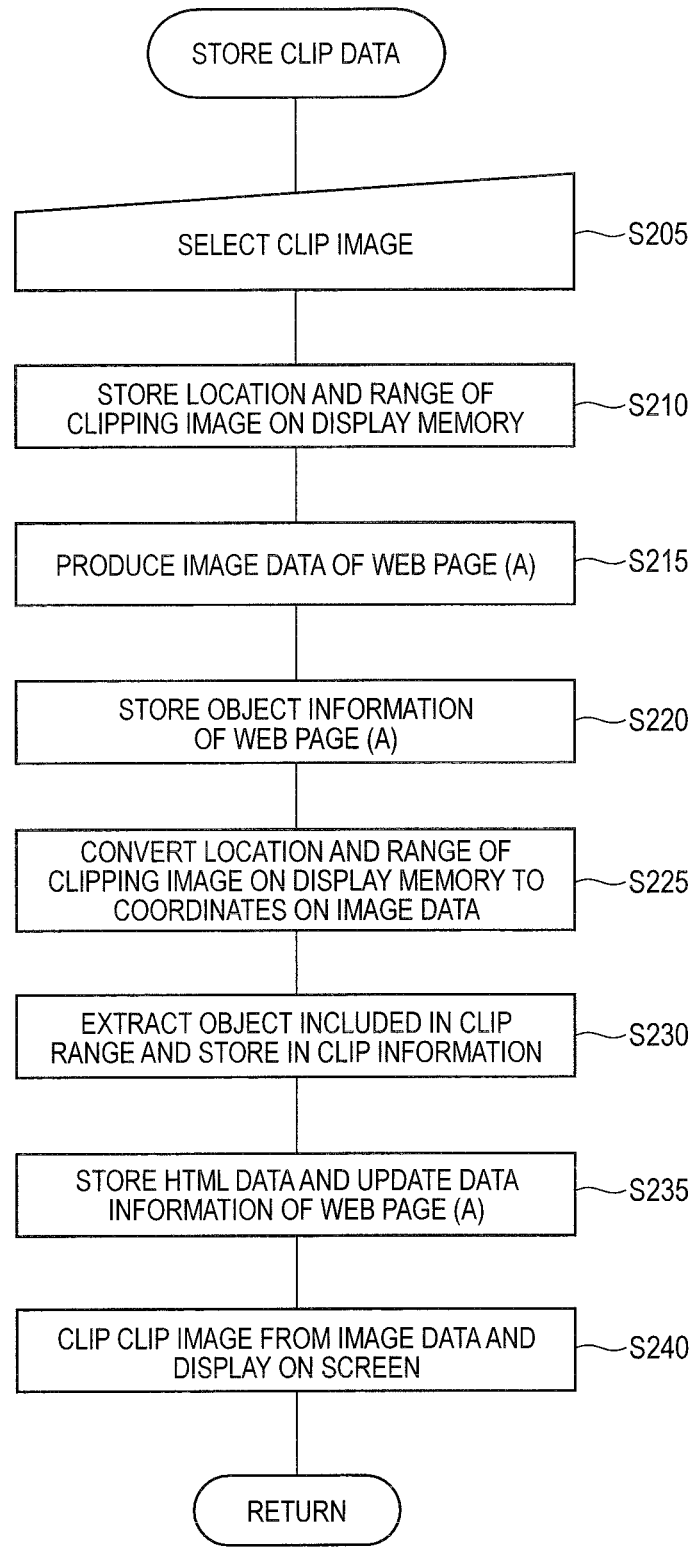
FIG. 3 is a flowchart of a process that stores clip data.

If the process shown in FIG. 3 is started, the PC 1 goes into a state for receiving an operation by a user to select a desired clip image (S205). In this state, the user can specify a predetermined range on a web browser and select a desired clip image.

In detail, in the present exemplary embodiment, the user uses a pointing device to point a desired point on the web browser and then performs an operation that pushes a button of the pointing device at the position, and, subsequently, performs a drag operation while pushing the button.

Then, a guide frame, such as the dashed line shown in FIG. 6A, is displayed on the web browser. The guide frame is a rectangular range with the line segment connecting the point where the user started to push the button and a point where the pointing device is currently pointing as the diagonal line thereof.

Since the point where the pointing device is currently pointing moves in conjunction with the drag operation, the dimensions of the guide frame in the horizontal and vertical directions vary with the movement. Additionally, if the user stops pushing the button of the pointing device while pointing at another desired point, the size of the guide frame is finalized at that point, and the inside range of the guide frame is selected as a clip image.

Meanwhile, the range selected as a clip image may be a range precisely fitting the inside of the guide frame, but, in this case, if the inside of the guide frame includes only a part of an object, it becomes necessary to clip only a part from an image or a text which is made up of a group of objects.

Therefore, if it is desired to reduce time taken for such partial clipping, in a case in which the inside of the guide frame includes a part of an object, the exemplary embodiment may be configured to select a range extended to include the entire object as a clip image.

Alternatively, in a case in which the inside of the guide frame includes only a part of an object and does not include the entire object, the exemplary embodiment may be configured to select a range excluding the entire object as a clip image.

With such selection methods, a clip image can be clipped with a group of objects as the minimum unit in any case, and it is not necessary to clip only a part from a group of objects.

Meanwhile, with respect to the selection methods, any of them may be adopted, and the exemplary embodiment may be configured to allow users to select and set any of the selection methods arbitrarily. However, in the description below, in a case in which the inside of the guide frame includes only a part of an object, the method that selects a range extended to a range including the entire object as a clip image is adopted.

Meanwhile, if the user's operation is finalized in S205, the PC 1 stores the location and range of the clipping on a display memory (S210). That is, since the above-described guide frame is operated on a display range, in S210, the location and range of the clipping are stored with coordinates corresponding to the display range.

Subsequently, the PC 1 produces the image data of a web page (A) (S215). At this point in time, the web page (A) is the latest web page delivered from the web server 7. However, since web pages delivered from the web server 7 are updated, in the description in the present specification during processes to be described below, a to-be-updated web page and an updated web page are distinguished with titles of web page (A) and web page (B), respectively.

In S220, when producing the image data of the web page (A), a variety of settings on the web browser are referenced, and thus the size of letters, the vertical and horizontal widths of drawing ranges on the memory or the like are determined according to the setting. Additionally, by drawing letters or images according to web page data with respect to the drawing range on such a memory, a web page shown in FIG. 6B is drawn in the drawing range.

Next, the PC 1 stores the object information of the web page (A) (S220). The object information is a set of information shown in FIG. 6C, and includes information of all objects present on the web page (A) sorted by each object included in the web page (A).

The object may be considered as a block with a somewhat large size or a segmented small unit. In any cases, basically, markup document data which are web page data are analyzed, and, objects are clipped with reliance on tags included therein.

For example, in a case in which the object is considered as a block with a somewhat large size, objects may be clipped using a type of tag included in markup document data "<div>~</div>" as the clipping unit. Alternatively, by using other tags as the clipping unit, it is possible to clip objects into further segmented units.

If description is made with a more specific example, in the case of a web page shown in FIG. 9A, a block displaying a weather forecast or a block displaying news are disposed in addition to a variety of images.

Here, since the block displaying a weather forecast is written by HTML data shown in FIG. 9B, in a case in which the block needs to be extracted as one object, the object may be clipped with "<div>~</div>" as the clipping unit.

In addition, in a case in which objects need to be clipped into further segmented units, it is also possible, based on tags, such as "<h3>~</h3>," "<li>~</li>," "<span>~</span>" or the like shown in FIG. 9B, to clip the corresponding segments as an independent object.

Furthermore, since the block displaying news is written by HTML data shown in FIG. 9C, it is possible, based on tags, such as "<div>~</div>," "<a>~</a>," "<p>~</p>" or the like, to clip the corresponding segments as an independent object.

In addition, since there are cases in which contents, such as news, are text data with a large number of letters, it is also possible to count the number of letters in a text at a part where the text continues and to clip every predetermined number of letters (for example, 20 letters) as an object. Alternatively, if a tag indicating a line break is included while text continues, it is also possible to clip objects using the tag as a delimiter.

In summary, it is preferable to predetermine the range of one object, and, in S220, objects are clipped according to the predetermination, and the object information is stored for every clipping object.

Meanwhile, once S220 is finished, the PC 1 converts the locations and ranges of clippings on the display memory into the coordinates on image data (S225). Usually, the location and range of the clipping on the display memory are indicated with coordinates set according to a resolution for display, and, on the other hand, the image data of the web page (A) has coordinates set according to a resolution for printing. Therefore, in S225, the coordinates of the locations and ranges of clippings, which have been finalized on the display memory based on the user's operation, on the image data of the web page (A) are obtained by calculation.

Subsequently, the PC 1 extracts objects included in the clip range and stores in the clip information (S230). In the case shown in FIG. 6A, the object (1) is the only object included in the clip range, and therefore, in this case, information of the object (1) is stored as the clip information as shown in FIG. 6D. If the clip range also includes other objects, information regarding the other objects is also stored as the clip information.

Additionally, the PC 1 stores the HTML data of the web page (A) and updates date information (S235). The updated data information is included in the header portion of the HTML data as shown in FIG. 7A, and information showing this date and time is stored.

Once the above processes are finished, the PC 1 clips the clip images from the image data and displays them on the screen (S240), thereby finishing the process shown in FIG. 3. In the exemplary embodiment, in a part of the display range on the web browser, a clip image displaying pane is secured to display thumbnails of the clip images, and, in S240, a process is performed to display thumbnails of the clip images on the clip image displaying pane. The thumbnails displayed herein are used by users to select update subjects which are to be updated in a process to be described below or to select printing subjects.

[Details of a Process for Updating Clip Data]

Next, the details of S125 will be described based on the flowchart in FIG. 4.

Figure 4B:
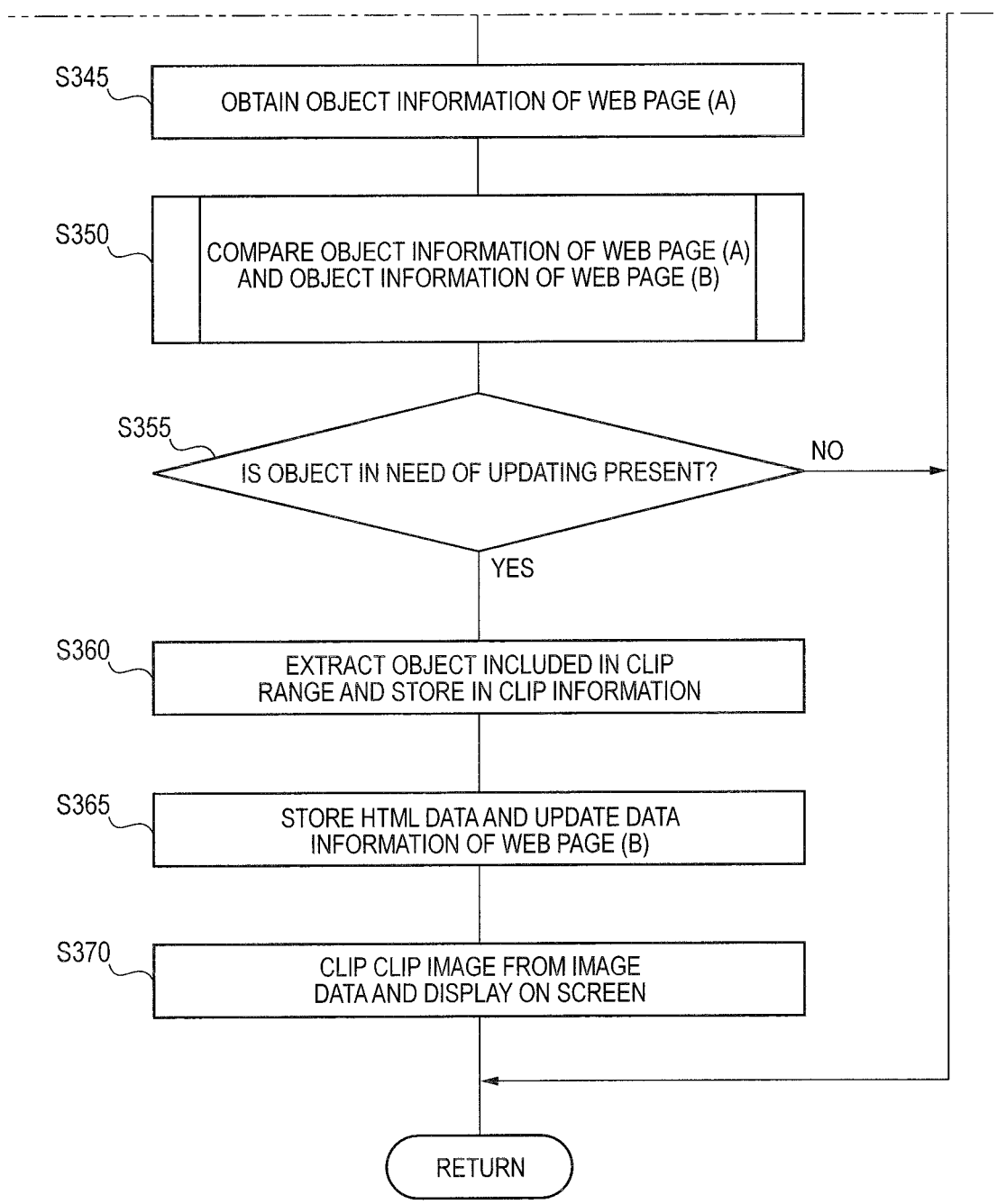

If the process shown in FIG. 4 is started, the PC 1 obtains the clip information (S305) and obtains the update date information of the web page (A) (S310). The clip information refers to the information stored in the above S230, and the update date information refers to the information stored in the above S235. Both of them are information that the PC 1 maintains.

In addition, the PC 1 demands the header information from the URL of the clip information (S315). In S315, the PC 1 issues an HTTP request to the web server 7 to demand the header information, and an HTTP response is returned from the web server 7 as a reply for the HTTP request. The HTTP response is data in a format shown in FIG. 7A and includes update date information therein.

There, the PC 1 obtains the update date information from the header information and determines whether the web page has been updated (S325). That is, whether or not the web page has been updated is determined by comparing the update date information obtained in S310 and the update date information obtained in S315.

Here, if the web page is determined as not updated (S325: NO), the clip image does not need to be updated, and therefore the process shown in FIG. 4 is finished. On the other hand, if the web page is determined as updated (S325: YES), the PC 1 obtains a web page (B) from the URL of the clip information.

That is, thus far, the web page obtained from the URL of the clip information has been the web page (A), but, if the web page is determined as updated to the web page (B), the PC 1 now obtains the latest web page (B).

In addition, the PC 1 produces the image data of the web page (B) (S335) and stores the object information of the web page (B) (S340). S335 and S340 are the equivalent processes of the above-described S215 and S220, and, with these processes, the object information is prepared even for the latest web page (B).

Accordingly, the PC 1 obtains the object information of the web page (A) (S345) and compares the object information of the web page (A) and the object information of the web page (B) (S350).

Figure 5:
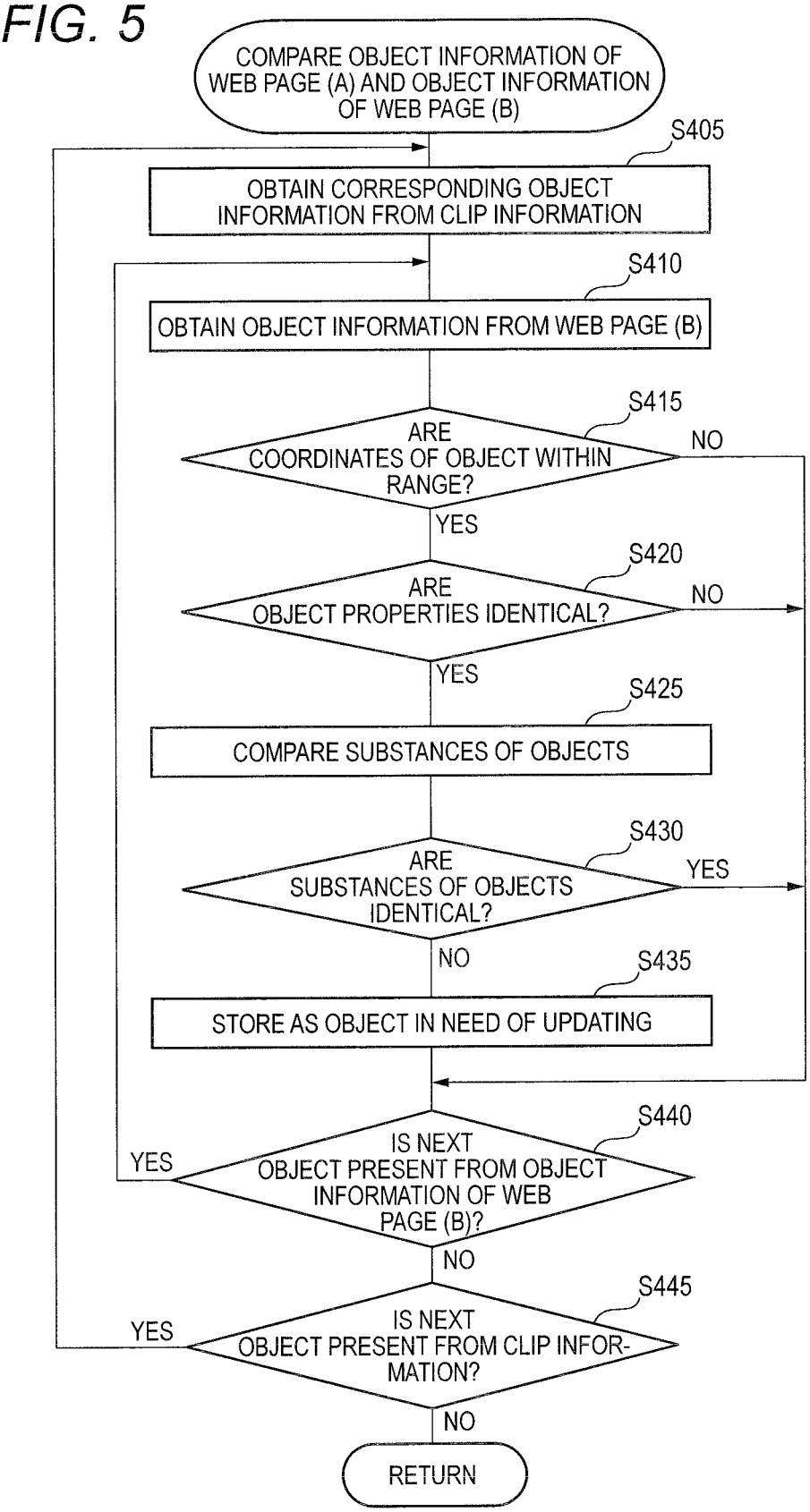
FIG. 5 is a flowchart of a process that compares the information of objects from the web pages (A) and (B)

FIG. 5 shows the details of S350. That is, if the process shown in FIG. 5 is started, the PC 1 obtains the corresponding object information from the clip information (S405). In addition, the PC 1 obtains object information from the web page (B) (S410).

In addition, the PC 1 determines whether or not the coordinates of the objects fall within the range (S415). In S415, it is determined whether or not the coordinates included in the object information corresponding to the clip image, which are obtained in S405, deviate from the coordinates included in the object information obtained in S410 only within a predetermined range.

Once such a determination is performed, not only objects with the matching coordinates before and after update but also objects with a deviation in the coordinates before and after update only within a predetermined range are considered as equivalent objects. On the other hand, objects with a deviation in the coordinates before and after update larger than a predetermined range are not considered as equivalent objects.

In S415, if the coordinates of an object are determined to be outside the range (S415: NO), since this means that there is no equivalent object in need of updating, in this case, the process proceeds to S440 without updating the clip image. Meanwhile, the above case may occur in a case in which the contents or layouts are significantly changed on the web page (A) and the web page (B).

Figure 8A:
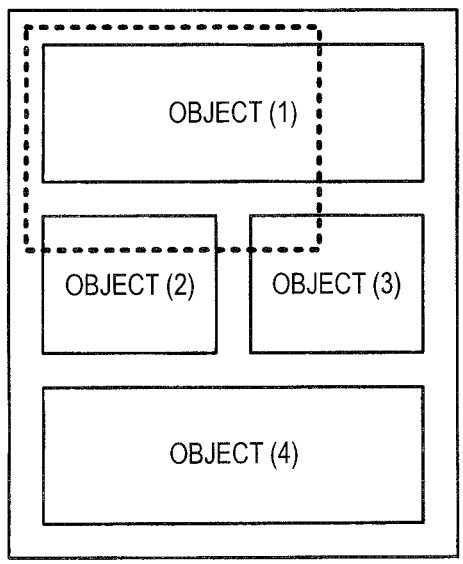
FIG. 8A is an explanatory diagram showing another example of the to-be-updated web page (A)
Figure 8B:
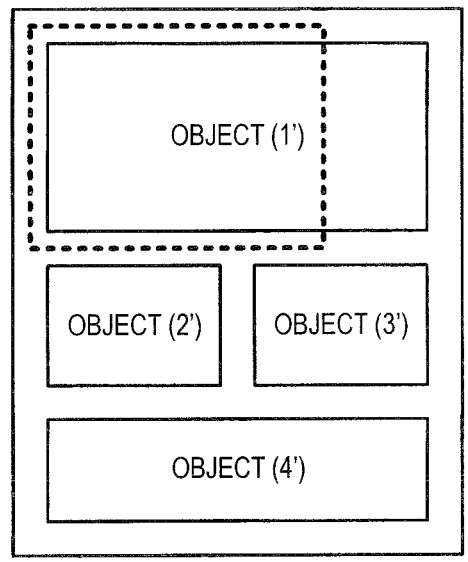
FIG. 8B is an explanatory diagram showing another example of the updated web page (B)

As specific examples, for example, as shown in FIG. 8A, in a case in which a range including objects (1) to (3) have been clipped as a clip image from a to-be-updated web page (A), there are cases in which, if the size of the object (1') becomes larger on an updated web page (B), the objects (2') and (3') are pushed away from the range of the clipping. In this case, there are cases in which the coordinates of the objects (2') and (3') are determined to be outside the range.

Figure 8C:
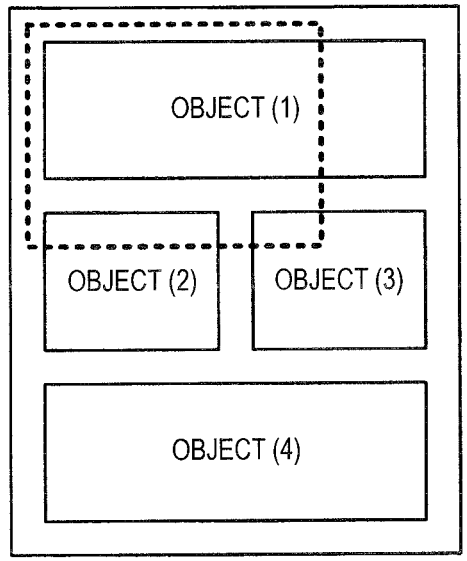
FIG. 8C is an explanatory diagram showing the other example of the to-be-updated web page (A)
Figure 8D:
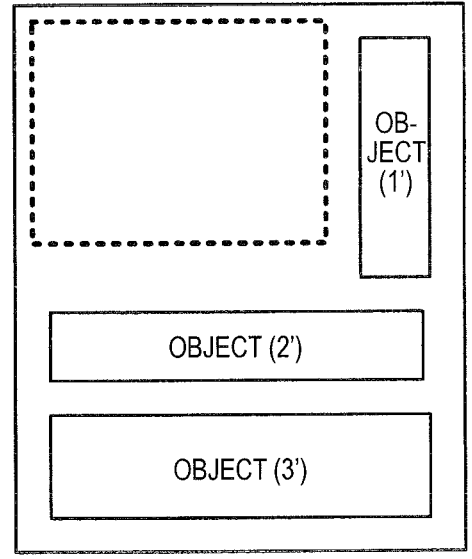
FIG. 8D is an explanatory diagram showing the other example of the updated web page (B)

In addition, for example, as shown in FIG. 8C, in a case in which a range including objects (1) to (3) has been clipped as a clip image from a to-be-updated web page (A), there are cases in which, if the layout of the objects (1') to (3') is significantly changed on an updated web page (B), the objects (1') to (3') are not included in the range of the clipping. Even in this case, there are cases in which the coordinates of the objects (1') to (3') are determined to be outside the range.

On the other hand, in S415, if the coordinates of an object are determined to be within the range (S415: YES), the PC 1 determines whether or not the properties of the objects are identical (S420). Here, in a case in which the properties of the objects are different, for example, one is an image, and the other is text, since the properties of the objects are different (S420: NO), in this case, the process proceeds to S440 without updating the clip image. The above case also may occur in a case in which the contents or layouts are significantly changed on the web page (A) and the web page (B).

In addition, in S415, in a case in which the properties of the objects are identical (S420: YES), at once, it appears that an object which may need to be updated has been found. Therefore, in this case, the PC 1 compares the substances of the objects (S425) and determines whether or not the substances of the objects are identical (S430).

Here, if the substances of the objects are determined to be identical (S430: YES), this means that, although the web page (A) has been updated to the web page (B), the same object as the to-be-updated object is present in the web page (B). Here, in this case, there is no point in going to the trouble of performing the update, and therefore the process proceeds to S440 without action.

On the other hand, if the substances of the objects are determined to be different (S430: NO), the PC 1 stores the object as an object in need of updating (S435). In addition, the PC 1 determines whether or not the next object is present from the object information of the web page (B) (S440).

In a case in which the next object is present in S440 (S440: YES), the process returns to S410 and then repeats S410 to S440. Thereby, in S405, with regard to only one item of object information which is obtained from the clip information, comparison with a plurality of objects on the web page (B) is repeated.

In detail, for example, in a case in which the range indicated by a dotted line in FIG. 7B is saved as a clip image, with regard to the only one object (1) which is obtained from the clip image, comparison with a plurality of objects (1') to (4') on the web page (B), which are shown in FIG. 7C, is repeated.

In addition, in S440, in a case in which the next object is not present (S440: NO), with regard to the only one item of object information which is obtained from the clip information, comparison is finished.

There, in this case, the PC 1 determines from the clip information whether or not the next object is present (S445). In S445, in a case in which the next object is present (S445: YES), the process returns to S405. Thereby, the processes of S405 and later are performed again, and, during the processes, the processes of S410 to S440 are also repeated.

In summary, if a clip image includes a plurality of objects, the above processes (S410 to S440) are repeated again with respect to the next object, and comparison with a plurality of objects on the web page (B) is repeated.

In detail, for example, in a case in which the range indicated by a dotted line in FIG. 7B is saved as a clip image, since the clip image includes a plurality of objects (1) to (3), with regard to the objects (2) and (3), comparison with a plurality of objects (1') to (4') on the web page (B), which are shown in FIG. 7C, is repeated.

In addition, once such a repeating process is performed as many times as the number of plural objects included in the clip image, since it is determined that the next object is not present in S445 (S445: NO), in this case, the process shown in FIG. 5 is finished.

Meanwhile, if the process shown in FIG. 5 is finished, S350 in FIG. 4 is finished, the PC 1 determines whether or not there is an object in need of updating (S355). In S355, if there is no object in need of updating stored in the above-described S435, it is determined that there is no object in need of updating (S355: NO), and, in this case, the process shown in FIG. 4 is finished.

On the other hand, in S355, if it is determined that there is an object in need of updating (S355: YES), the PC 1 extracts objects included in the clip range and stores in the clip information (S360). Additionally, the PC 1 stores the HTML data and update date information of the web page (B) (S365), and clips the clip image from image data and displays on the screen (S370), thereby finishing the process shown in FIG. 4.

According to the PC 1 described above, it is possible to save objects included in a range clipped as a clip image among objects configuring a web page and print the saved objects with the printer 3. Furthermore, if there is a user's operation that gives a command for the update of the clip image, it is possible to update the objects included in the clip image to the latest objects.

As a result, even without carrying out a user's operation to visually check, using a web browser, whether or not objects included in a range clipped as a clip image have been updated, an operation that deletes an old clip image and newly saves a clip image including the latest objects, or the like, respectively, it is possible to output a clip image including the latest objects from the printer 3 in an extremely simple manner.

In addition, in the above PC 1, since objects before and after update are compared, and update is performed when both objects are different, there is no case in which update is performed equally even for objects which have not been updated, and therefore the PC 1 does not carry out an update process needlessly. As a result, it is possible to reduce an unnecessary load applied to the PC 1 to a corresponding extent.

In addition, in the PC 1, an updated object is recognized as the latest object corresponding to a to-be-updated object and then whether or not the object has been updated is determined when the updated object is located within a predetermined range from the location of the to-be-updated object and the types of both objects are matching before and after update. As a result, it is possible to control misrecognition in which an object not related to a to-be-updated object is recognized as the latest object in a case in which the configuration of a web page is significantly changed.

In addition, in the PC 1, since a clip image is updated after checking the update date information of a web page, even when a user performs an operation that gives a command for update, if the web page has not been updated, the PC 1 does not carry out a needless update process. As a result, it is possible to reduce an unnecessary load applied to the PC 1 to such an extent.

In addition, in the PC 1, since a range is specified on a web page, a clip image including the objects which overlaps with the range is clipped, even when a user does not exactly know the ranges occupied by individual objects, it is possible to select desired objects with intuitive operations as if clipping a part of a web page.

Modified Exemplary Embodiments

The exemplary embodiment of the invention has been described above. However, the invention is not limited to the above-described exemplary embodiments, and can be carried out in other various formats.

For example, the above-described exemplary embodiment is configured to carry out the update of clip data and printing of a clip image with user's separate operations in S120 and S130, but clip data may be updated in conjunction with a user's command for printing a clip image.

In detail, the exemplary embodiment may be configured to carry out S125 after YES in S130 and before carrying out S135. With such a configuration, it is possible to print a clip image updated to the latest object only with an operation that gives a command for printing of the clip image without following the order in which a user performs an operation that gives a command for the update of clip data and then a command for printing.

The above-described exemplary embodiment shows an example in which a program for carrying out the above processes in the PC 1 is installed as a plug-in in a web browser. Alternatively, a browser may have a function to carry out the above processes.

The above-described exemplary embodiment uses the printer 3 as an example of an image forming apparatus. Alternatively, the invention is applicable to an image forming apparatus other than a printer (for example, electronic paper that electronically reproduces a printing medium according to a display medium or a device equipped with software capable of forming images with respect to imaginary printing media that is operable in a PC (for example, PDF files or the like)) is used.

The above-described exemplary embodiment shows an example in which the PC 1 and the printer 3 are configured as separate apparatuses. Alternatively, it is possible to adopt the configuration of the invention in an integrated device in which a user interface equivalent to the PC 1 is installed in a device equivalent to the printer 3.

Incidentally, in the above-described exemplary embodiments and modified exemplary embodiments, the PC 1 or the CPU 11 corresponds to an example of a computer in the invention, and the printer 3 corresponds to an example of an image forming apparatus in the invention.

In addition, the CPU 11 that carries out S115, the CPU 11 that carries out S125 and the CPU 11 that carries out S135 correspond to examples of an object information storage control unit, an object information update control unit and an image forming control unit in the invention, respectively.

In addition, the CPU 11 that carries out S430 corresponds to an example of a determination unit in the invention.

What is claimed is:

1. A non-transitory computer-readable medium having an image forming control program stored thereon and readable by a computer on which a web page display unit is operated, wherein the web page display unit is configured to display web pages that the web page data describe on a web page display range present on the screen of a display apparatus based on web page data supplied from a web page data source, said image forming control program, when executed by the computer, causes the computer to perform functions comprising:

an object information storage control unit which, in a case in which a user performs an operation to select one or a plurality of objects from objects configuring the web pages displayed on the web page display range, performs control that stores in a storage unit object information including information necessary to print the selected objects and stores the location of the object in the web page, the type of the object in the storage unit and substance data corresponding to the stored object also as the object information;

a determination unit which, in a case in which a user performs an operation that gives a command for update of the stored object that is described by the object information stored in the storage unit by the object information storage control unit, identifies, among objects configuring a latest web page supplied from the web page data source, objects with a location of the object in the web page within a predetermined range from the location of the stored object as candidate objects for an equivalent-object corresponding to the stored object, wherein when objects among the objects configuring the latest web page are identified as candidate objects, the determination unit determines whether or not the type of the object of the candidate objects match that of the stored object to determine if the candidate objects correspond to the stored object, and wherein when a candidate object corresponds to the stored object, then the determination unit determines whether or not the stored object and the corresponding candidate object are identical based on a comparison of the substance data of the stored object with substance data of the corresponding candidate object;

an object information update control unit which, in a case in which the determination unit determines the stored object and the corresponding candidate object are not identical, performs control that updates, object information describing the stored object stored in the storage unit with object information describing the corresponding candidate object; and an image forming control unit that controls to form images of objects that the object information describes on an output medium based on the object information stored in the storage unit.

2. The non-transitory computer-readable medium having an image forming control program according to claim 1, wherein in a case in which a user performs an operation that gives a command in order to form images of the stored object that the object information stored in the storage unit by the object information storage control unit describes, the determination unit recognizes the user's operation as a user's operation that gives a command for update of the stored object and determines whether or not the stored object and the latest object are identical.

3. The non-transitory computer-readable medium having an image forming control program according to claim 2, wherein the command in order to form images is a print command.

4. The non-transitory computer-readable medium having an image forming control program according to claim 1,
wherein the object information storage control unit performs control that stores information including the update date of the web page in the storage unit as the object information, and
wherein in a case in which the update date of the latest web page supplied from the source matches the update date stored as the object information, the determination unit determines that the stored object and the corresponding candidate object are identical.

5. The non-transitory computer-readable medium having an image forming control program according to claim 1,
wherein in a case in which a user performs an operation that selects a selection range on a web page displayed on the web page display range, the object information storage control unit recognizes the user's operation as a user's operation to select objects present in locations which overlap with the selection range and performs control that stores in a storage unit object information including information necessary to print the selected objects.

6. The non-transitory computer-readable medium having an image forming control program according to claim 5,
wherein in a case in which a user performs an operation that selects a predetermined range on a web page displayed on the web page display range, the object information storage control unit recognizes the user's operation as a user's operation to select objects present in locations which overlap with the predetermined range, and further performs control that extracts the selected one or the selected plurality of objects and stores the extracted one or the extracted plurality of objects in the storage unit.

7. The non-transitory computer-readable medium having an image forming control program according to claim 1,
wherein in a case in which a user performs an operation to select one or a plurality of objects from objects configuring the web pages displayed on the web page display range, the object information storage control unit further performs control that extracts the selected one or the selected plurality of objects and stores the extracted one or the extracted plurality of objects in the storage unit.

8. The non-transitory computer-readable medium having an image forming control program according to claim 1,
wherein in a case in which a user performs an operation to select one or a plurality of objects from objects configuring the web pages displayed on the web page display range, the object information storage control unit further performs control that stores the location and range of the selection using coordinates corresponding to a display range, and wherein the location and range is converted into coordinates corresponding to printing resolution based in part on image data generated from the web page data.

9. An image forming control method for making a computer, on which a web page display unit is operated, wherein the web page display unit is configured to display web pages that the web page data describe on a web page display range present on the screen of a display apparatus based on web page data supplied from a web page data source, the image forming control method controls the computer to:
in a case in which a user performs an operation to select one or a plurality of objects from objects configuring the web pages displayed on the web page display range, perform control that stores in a storage unit object information including information necessary to print the selected objects and stores the location of the object in the web page, the type of the object in the storage unit and substance data corresponding to the stored object also as the object information;
in a case in which a user performs an operation that gives a command for updating the stored object which is described by the object information stored in the storage unit, perform control that:
identifies, among objects configuring the latest web page supplied from the source, objects with a location of the object in the web page within a predetermined range from the location of the stored object as candidate objects for an equivalent object corresponding to the stored object,
determines whether or not the type of the object of the candidate objects match that of the stored object to determine if the candidate objects correspond to the stored object, when objects among the objects configuring the latest web page are identified as candidate objects, then
determines, when the candidate object corresponds to the stored object, whether or not the stored object and the corresponding candidate object are identical based on a comparison of the substance data of the stored object with substance data of the corresponding candidate object, and updates, based upon the determining that the stored object and the corresponding candidate object are not identical, object information describing the stored object stored in the storage unit with object information describing the corresponding candidate object; and
control to form images of objects that the object information describes on an output medium based on the object information stored in the storage unit.

10. An image processing apparatus comprising:
a processor comprising hardware configured to provide:
a web page display unit which, based on web page data supplied from a web page data source, is configured to display web pages that the web page data describe on a web page display range present on the screen of a display apparatus;
an object information storage control unit which, in a case in which a user performs an operation to select one or a plurality of objects from objects configuring the web pages displayed on the web page display range, is configured to perform control that stores in a storage unit object information including information necessary to print the selected objects and store the location of the object in the web page, the type of the object in the storage unit and substance data corresponding to the stored object also as the object information;
a determination unit which, in a case in which a user performs an operation that gives a command for update of the stored object that is described by the object information stored in the storage unit by the object information storage control unit, is configured to:
identify, among objects configuring a latest web page supplied from the web page data source, objects with a location of the object in the web page within a predetermined range from the location of the stored object as candidate objects for an equivalent object corresponding to the stored object,
determine whether or not the type of the object of the candidate objects match that of the stored object to determine if the candidate objects correspond to the stored object, when objects among the objects configuring the latest web page are identified as candidate objects, and then is determine, when the candidate object corresponds to the stored object, whether or not the stored object and the corresponding candidate object are identical based on a comparison of the substance data of the stored object with substance data of the corresponding candidate object;

an object information update control unit which, in a case in which the determination unit determines the stored object and the corresponding candidate object are not identical, is configured to perform control that updates, object information describing the stored object stored in the storage unit with object information describing the corresponding candidate object; and an image forming control unit that is configured to control to form images of objects that the object information describes on an output medium based on the object information stored in the storage unit.

* * * * *